(12) United States Patent
Kaida et al.

(10) Patent No.: US 7,623,210 B2
(45) Date of Patent: Nov. 24, 2009

(54) LCD APPARATUS HAVING INSULATING LAYER WITH INCREASED THICKNESS OVER AND IN THE SAME DIRECTION AS DATA LINE WITH PIXEL ELECTRODES OVERLAPPING TOP SURFACE THEREOF TO PREVENT LIGHT LEAKAGE

(75) Inventors: Hirokazu Kaida, Kanagawa (JP);
Toshinobu Sekiuchi, Kumamoto (JP);
Makoto Akagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 583 days.

(21) Appl. No.: 11/268,953

(22) Filed: Nov. 8, 2005

(65) Prior Publication Data

US 2006/0109408 A1     May 25, 2006

(30) Foreign Application Priority Data

Nov. 25, 2004     (JP)     ............................ P2004-339921

(51) Int. Cl.
*G02F 1/1333* (2006.01)
(52) U.S. Cl. .................................................... 349/138
(58) Field of Classification Search .................. 349/138; 345/54
See application file for complete search history.

(56) References Cited

U.S. PATENT DOCUMENTS

| | | | | |
|---|---|---|---|---|
| 5,396,354 | A  * | 3/1995 | Shimada et al. | ............... 349/41 |
| 6,888,596 | B2 * | 5/2005 | Nakayoshi et al. | ........... 349/113 |
| 7,142,260 | B2 * | 11/2006 | Yang | ............................ 349/38 |
| 7,209,201 | B2 * | 4/2007 | Lin et al. | ..................... 349/129 |
| 7,277,148 | B2 * | 10/2007 | Kim et al. | .................... 349/138 |
| 2003/0058375 | A1* | 3/2003 | Moon et al. | .................... 349/42 |

* cited by examiner

*Primary Examiner*—John Heyman
(74) *Attorney, Agent, or Firm*—Sonnenschein Nath & Rosenthal LLP (57) ABSTRACT

A liquid crystal display apparatus according to the present embodiment has pixel electrodes arranged in a first and a second directions crossed each other; a signal line formed in a lower layer of the pixel electrode and extending in the second direction between the pixel electrodes arranged in the first direction; a scan line formed in a lower layer of the pixel electrode and extending in the first direction; a switching device formed so as to correspond to the pixel electrodes and connected to the signal line, the scan line, and the pixel electrode; and an insulating layer formed between the pixel electrode and a lower layer including the signal line and the scan line, and having a surface step in a region between the pixel electrodes. An edge portion of the pixel electrode is formed to overlap the surface step of the insulating layer.

6 Claims, 10 Drawing Sheets

LCD APPARATUS HAVING INSULATING LAYER WITH INCREASED THICKNESS OVER AND IN THE SAME DIRECTION AS DATA LINE WITH PIXEL ELECTRODES OVERLAPPING TOP SURFACE THEREOF TO PREVENT LIGHT LEAKAGE

CROSS REFERENCES TO RELATED APPLICATIONS

The present invention contains subject matter related to Japanese Patent Application No. JP 2004-339921 filed in the Japanese Patent Office on Nov. 25, 2004, the entire contents of which being incorporated herein by reference.

BACKGROUND OF THE INVENTION

1. Field of the Invention

The present invention relates to, for example, an active matrix type liquid crystal display apparatus.

2. Description of the Related Art

There is known, a liquid crystal display apparatus has been applied to various fields such as an office automation equipment, a clock, and a television in terms of features of light weight, thinness, and low power consumption. Specially, an active matrix type display apparatus in which a thin film transistor switches a pixel can realize an excellent response. Therefore, the active matrix type display apparatus has been utilized to a display monitor for a computer or a television which are demanded to display a number of image data.

Recently, specifically, a projection type display apparatus in which a liquid crystal panel of several cm square in a panel size and over 10 μm in a pixel pitch and an optical system for projection are combined has been produced. The above liquid crystal display apparatus is demanded to increase an aperture ratio and to raise contrast of an image in order to realize a high quality image display.

In the above liquid crystal display apparatus, by a direct-current drive, generally, impurity ions are distributed unevenly in a liquid crystal layer or in an alignment layer on an electrode substrate to thereby generate a polarization of liquid crystal molecules. As a result, a voltage-transmittance characteristic changes, namely, a so-called "sticking phenomenon" occurs. To prevent the above, potential of the liquid crystal is typically refreshed by an alternate-current drive. Further, in the liquid crystal display apparatus, by driving the entire field at the same-potential, a minute fluctuation of transmittance due to a polarity reversal is easily observed as a flicker. Therefore, a line-reversal drive in which a polarity is reversed in each line or each several lines to chancel the flicker has been adopted.

By the above line-reversal drive, a potential difference is generated between adjoining pixel electrodes having different polarities, and the potential difference is almost double of that between a counter electrode and a pixel electrode. Therefore, a strong lateral electric strength is generated between the adjoining pixel electrodes in a vertical direction. The lateral electric strength causes a reverse tilt domain in which the liquid crystal molecules are arranged in a direction different from its original arrangement in a scan line direction.

Therefore, in the above line-reversal drive type liquid crystal display apparatus, in the case where a size of the pixel is approximately over 10 μm, a light leakage surrounding the pixel makes contrast to decrease. This is because that, by increasing an aperture ratio in order to improve a light utilization efficiency, a shield region is made small to thereby enable an observation of portions disturbed with the liquid crystal.

Accordingly, Japanese Unexamined Patent Publication (Kokai) No. 2004-118048 discloses that, in the line-reversal drive type liquid crystal display apparatus, a rubbing direction is selected so as to difficultly generate the reverse tilt domain to thereby prevent the light leakage generated in the vicinity of the scan line.

SUMMARY OF THE INVENTION

On the other hand, the amount of the light leakage in a signal line side is smaller than that of the reverse tilt domain, so the light leakage had not been disadvantage. However, the shield region is made small as the aperture ratio becomes increased, so the amount of the light leakage therein is becoming disadvantage.

It is found that the light leakage near the signal line side is caused by a disturbance of the liquid crystal arrangement due to a disturbance of the electric strength. That is, two pixel electrodes adjoined in parallel through the signal line are made the same potential in displaying normally black images, so the lateral electric strength is not applied between the two pixel electrodes. On the other hand, a potential of a lower interconnection of the pixel electrode causes the disturbance of the electric strength therebetween. Consequently, it is found that the arrangement of the liquid crystal is disturbed to generate the light leakage.

The present invention is to provide a liquid crystal display apparatus able to prevent the light leakage in the vicinity of the signal line of the pixel electrode.

According to an embodiment of the present invention, there is provided a liquid crystal display apparatus having: a plurality of pixel electrodes arranged in a first direction and in a second direction perpendicular to the first direction; a signal line formed in a lower layer of the pixel electrode and extending in the second direction between the pixel electrodes arranged in the first direction; a scan line formed in a lower layer of the pixel electrode and extending in the first direction; a switching device formed so as to correspond to the pixel electrodes and connected to the signal line, the scan line, and the pixel electrode; and an insulating layer formed between the pixel electrode and a lower layer including the signal line and the scan line, and having a surface step in a region between the pixel electrodes arranged in the first direction. An edge portion of the pixel electrode is formed to overlap the surface step of the insulating layer.

According to an embodiment of the present invention, there is provided a liquid crystal display apparatus having: a plurality of pixel electrodes arranged in a first direction and in a second direction perpendicular to the first direction; a signal line formed in a lower layer of the pixel electrode and extending in the second direction between the pixel electrodes arranged in the first direction; a scan line formed in a lower layer of the pixel electrode and extending in the first direction; a switching device formed so as to correspond to the pixel electrodes and connected to the signal line, the scan line, and the pixel electrode; and an insulating layer formed between the pixel electrode and a lower layer including the signal line and the scan line. A distance from the signal line to a surface of the insulating layer is defined as 400 to 1200 nm in thickness.

According to an embodiment of the present invention, there is provided a liquid crystal display apparatus having: a plurality of pixel electrodes arranged in a first direction and in a second direction perpendicular to the first direction; a signal line formed in a lower layer of the pixel electrode and extending in the second direction between the pixel electrodes arranged in the first direction; a scan line formed in a lower layer of the pixel electrode and extending in the first direction; a switching device formed so as to correspond to the pixel electrodes and connected to the signal line, the scan line, and the pixel electrode; an insulating layer formed between the pixel electrode and a lower layer including the signal line and the scan line, and having a surface step in a region between the pixel electrodes arranged in the first direction; and a shield line formed at a position corresponding to the signal line and the scan line in the insulating layer. A distance from the shield line to a surface of the insulating layer is defined as 400 to 1200 nm in thickness.

According to the liquid crystal display apparatus of the present embodiments, the light leakage can be prevented in the vicinity of the signal line of the pixel electrode.

BRIEF DESCRIPTION OF THE DRAWINGS

These features of embodiments of the present invention will be described in more detail with reference to the accompanying drawings, in which.

DESCRIPTION OF THE PREFERRED EMBODIMENTS

The above and other features of embodiments of the present invention will be apparent in more detail with reference to the accompanying drawings.

First Embodiment

Figure 1:
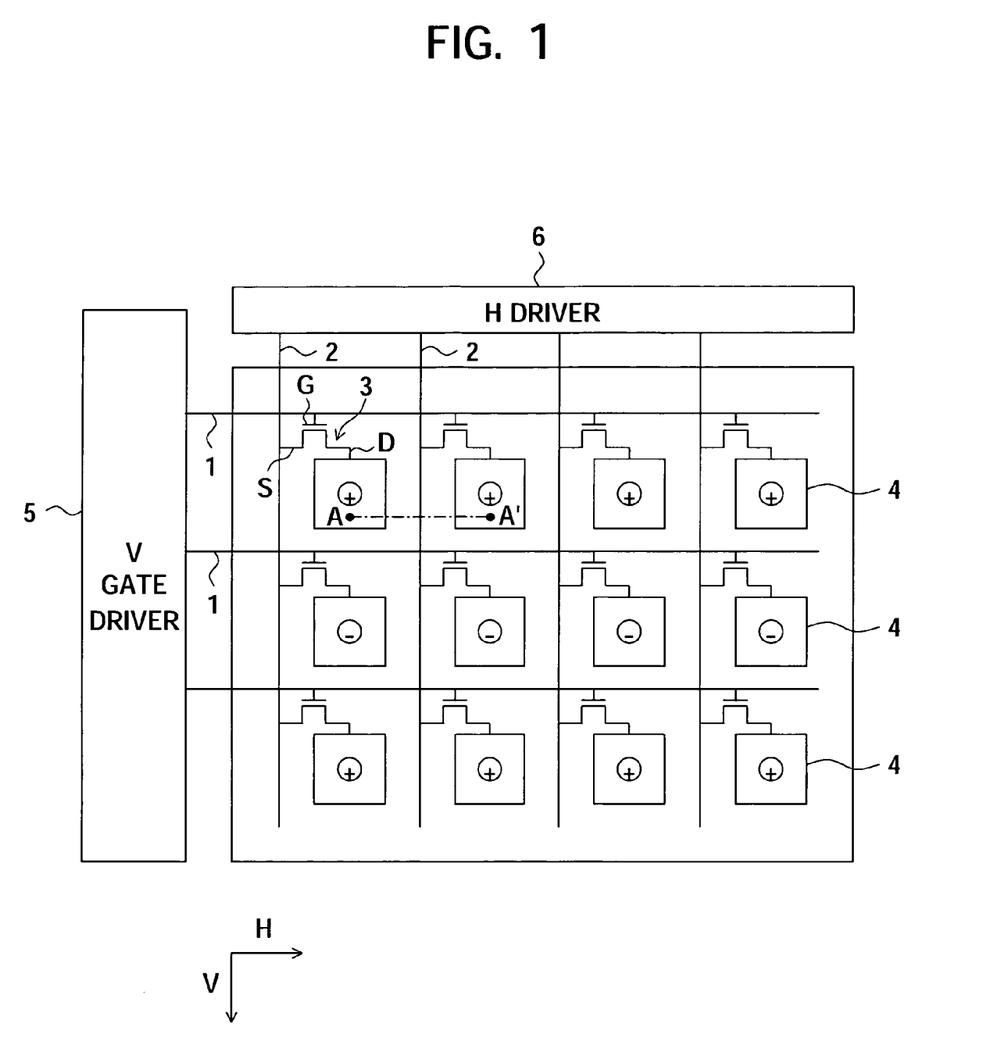
FIG. 1 is a circuit diagram of a liquid crystal display apparatus according to a first embodiment.

FIG. 1 is a circuit diagram of a liquid crystal display apparatus according to the present embodiment. In the present embodiment, a transmissive liquid crystal display apparatus will be described as an example.

On a substrate, scan lines 1 long in a horizontal direction (a first direction) H are arranged in a vertical direction (a second direction) V. On the substrate, signal lines 2 long in the vertical direction V are arranged in the horizontal direction H.

At portions where the scan line 1 crosses the signal line 2, thin film transistors (TFT) 3 are provided as switching devices. A plurality of gates G of the thin film transistors 3 arranged in the horizontal direction H is connected to the same scan line 1. A plurality of sources S of the thin film transistors 3 arranged in the vertical direction V is connected to the same signal line 2.

Pixel electrodes 4 covering regions surrounded by the scan lines 1 and the signal lines 2 are arranged in matrix in the horizontal direction H and in the vertical direction V. The signal line 2 is arranged between the pixel electrodes 4 arranged in the horizontal direction H. The scan line 1 is arranged between the pixel electrodes 4 arranged in the vertical direction V. The pixel electrode 4 is made of, for example, indium tin oxide (ITO) or other transparent electrode. The pixel electrode 4 is connected to a drain D of the thin film transistor 3.

A plurality of the scan lines 1 arranged in the vertical direction V is connected to a V gate driver 5. The V gate driver 5 selects one scan line 1 in a horizontal duration.

A plurality of the signal lines 2 arranged in the horizontal direction H is connected to an H driver 6. The H driver 6 successively selects each of the signal line 2 in a horizontal duration and supplies a video signal (data signal) to the signal line 2. In order to prevent a flicker of an image, the H driver 6 supplies a vide signal in which a polarity is reversed in every few pixel electrodes, for example, in every pixel electrode in column (line reversal drive).

Figure 2:
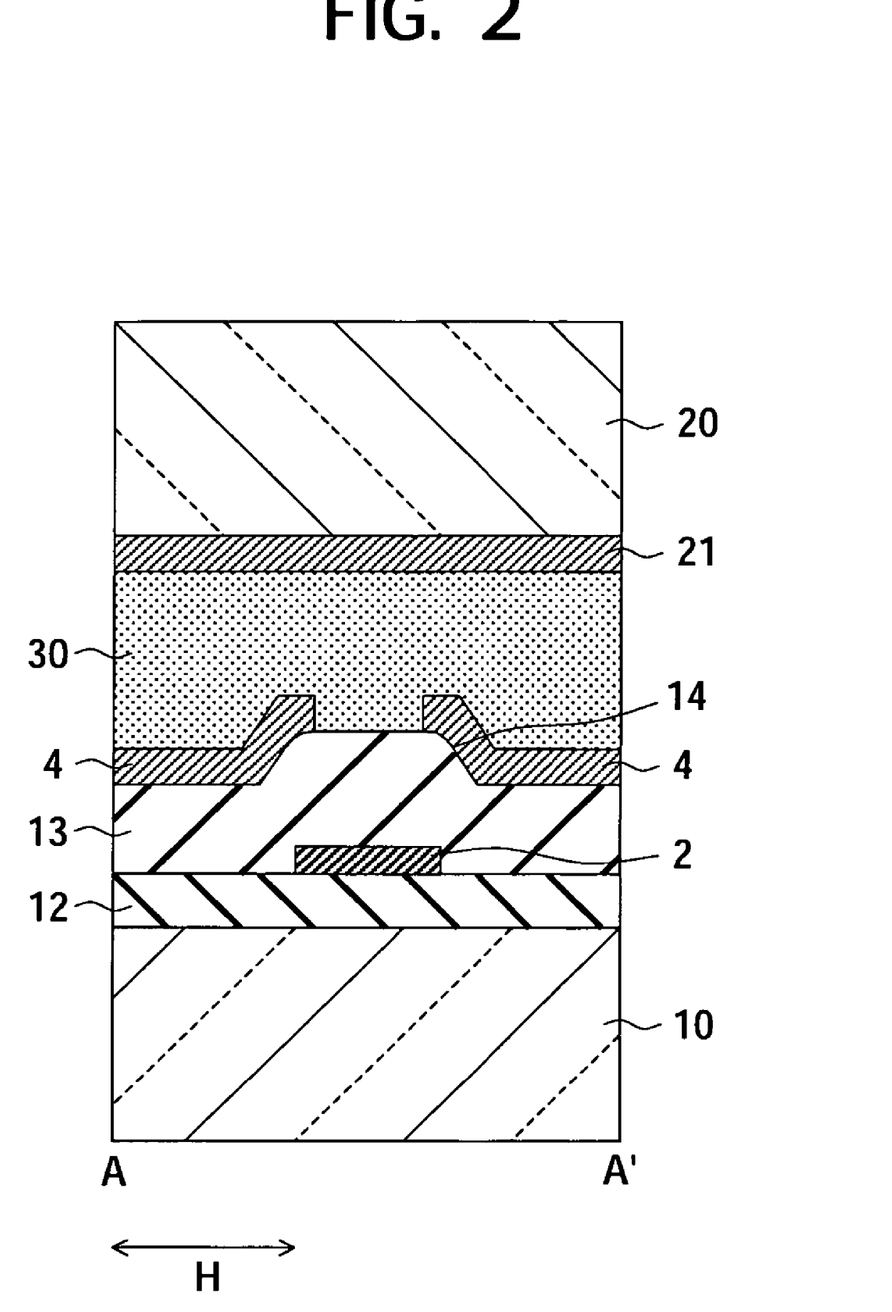
FIG. 2 is a cross-sectional view along line A-A' of FIG. 1.

FIG. 2 is a cross-sectional view along line A-A' of FIG. 1.

A TFT substrate 10 has a transparent insulating substrate such as a silica substrate and the thin film transistor 3 functioning as a switching device not shown in the figure. The TFT substrate 10 is formed on it with an insulating layer 12 made of, for example, silicon oxide. The insulating layer 12 is formed on it with the signal line 2.

An insulating layer 13 made of, for example, silicon oxide is formed on the signal line 2 and the insulating layer 12. The insulating layer 13 is formed so as to include a surface step 14 at a position corresponding to the signal line 2, namely, at a boundary portion of a pixel in the horizontal direction H. As can be appreciated, the surface step 14 is a stripe-shaped structure extending in the same direction as the signal line 2 and is in registry with the signal line 2. Further the insulating layer 13 has a first thickness in that portion without the surface step 14 and a second thickness greater than the first thickness in that portion, excluding the sidewalls of the surface step 14, having the surface step 14.

The pixel electrode 4 is formed on the insulating layer 13. An edge portion of the pixel electrode 4 in the horizontal direction H is formed so as to overlap the surface step 14 of the insulating layer 13. As can be seen in FIG. 2, the edge portion of the pixel electrode conforms about the edges of sidewalls of the surface step 14 and extends over a top surface of the surface step. As a result, the edge portion thereof protrudes to a liquid crystal side.

An arrangement layer performed with an aligning treatment, omitted in the figure, is formed on the pixel electrode 4 and the insulating layer 13.

A counter substrate 20 is arranged to be faced to the TFT substrate 10. The counter substrate 20 is formed of a glass substrate, a silica substrate, or other transparent insulating substrates. The counter substrate 20 is formed over it with a counter electrode (common electrode) 21 made of ITO or other transparent electrodes. The counter electrode 21 is formed on it with a color filter, omitted in the figure, if necessary. And the color filter is formed on it with an arrangement layer performed with the aligning treatment, omitted in the figure.

A liquid crystal 30 is filled between the TFT substrate 10 and the counter substrate 20. The liquid crystal 30 is made of a positive twist nematic liquid crystal substance, for example. Further, in the above liquid crystal display apparatus, an incidence side polarizing plate and an emitting side polarizing plate, omitted in the figure, are mounted respectively.

Figure 3:
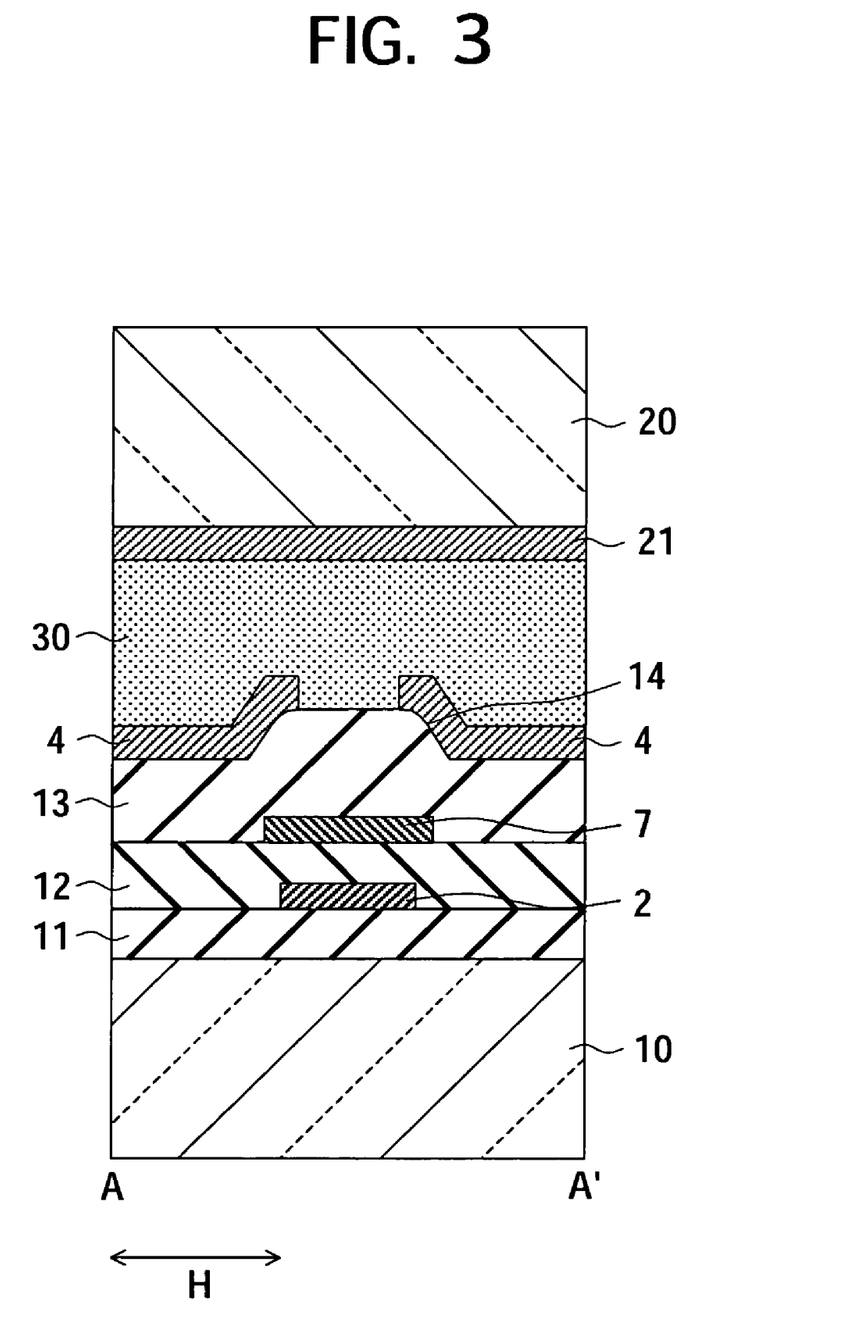
FIG. 3 is a cross-sectional view along line A-A' of FIG. 1 in the case where a shield interconnection is provided above a signal line.

Otherwise, as shown in FIG. 3, a shield interconnection 7 may be placed above the signal line 2. A structure unit shown in FIG. 3 is adopted to a transmissive liquid crystal panel used to mainly a liquid crystal projector.

In an example shown in FIG. 3, an insulating layer 11 made of silicon oxide is formed on the TFT substrate 10. The insulating layer 11 is formed on it with the signal line 2. The signal line 2 and the insulating layer 11 are formed on them with the insulating layer 12. The insulating layer 12 is formed on it with the shield interconnection 7. The shield interconnection 7 is formed at a position corresponding to the signal line 2 and the scan line 1 not shown in the figure. The shield interconnection 7 and the insulating layer 12 are formed on them with the insulating layer 13, and the insulating layer 13 is formed in it with the surface step 14.

Next, a method of producing the liquid crystal display apparatus will be descried. Note that, as an example, a method of producing a structure shown in FIG. 2 will be descried.

Figure 4A:
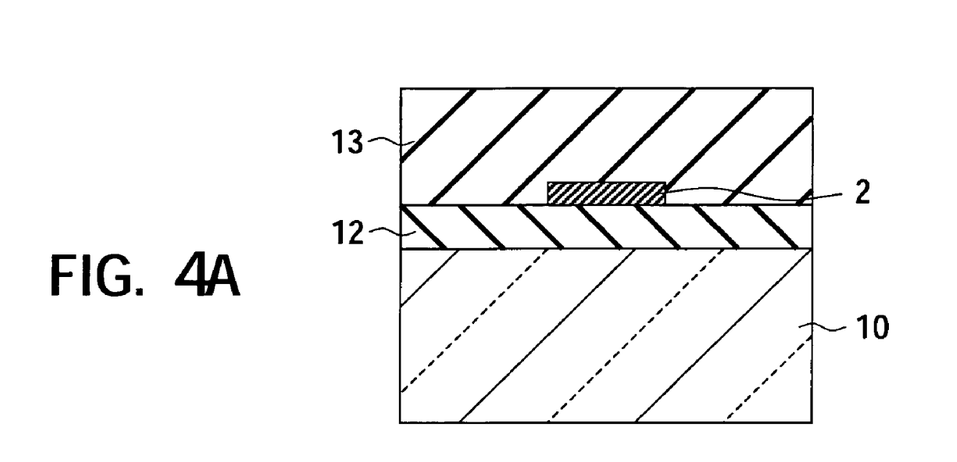
FIGS. 4A to 4D are cross-sectional views of a process of producing the liquid crystal display apparatus according to the first embodiment.

As shown in FIG. 4A, the thin film transistor is formed in the transparent insulating substrate to thereby form the TFT substrate 10. The insulating layer 12 is formed on the TFT substrate 10 to cover the thin film transistor. The signal line 2 and the scan line 1, which is not shown in the figure, are formed, and the insulating layer 13 is formed over them. Then, a chemical mechanical polishing (CMP) method is performed to flatten a surface of the insulating layer 13.

Figure 4B:
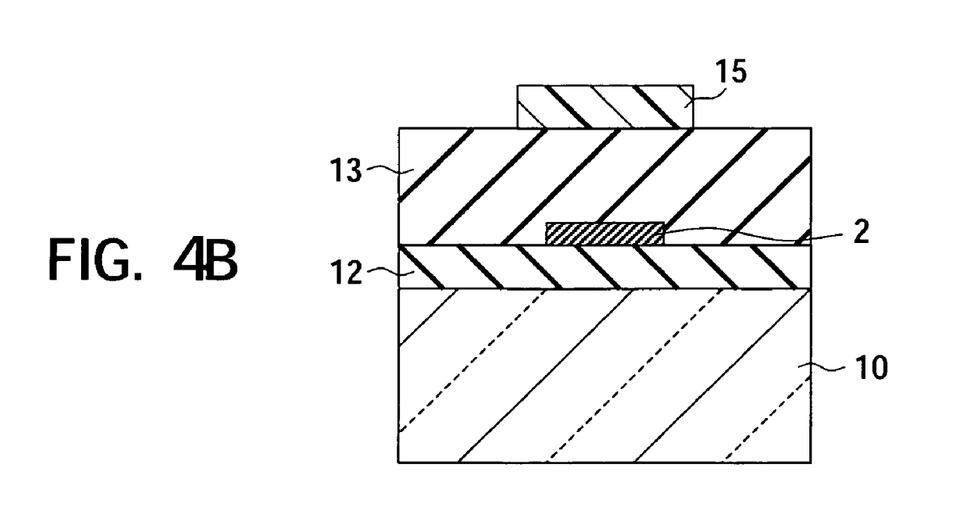

As shown in FIG. 4B, lithography method is performed to form a pattern of a resist film 15 at a position corresponding to the signal line 2 on the insulating layer 13. As a result, the pattern of the resist film 15 is strip shaped, which is long in the vertical direction V and arranged in the horizontal direction H.

Figure 4C:
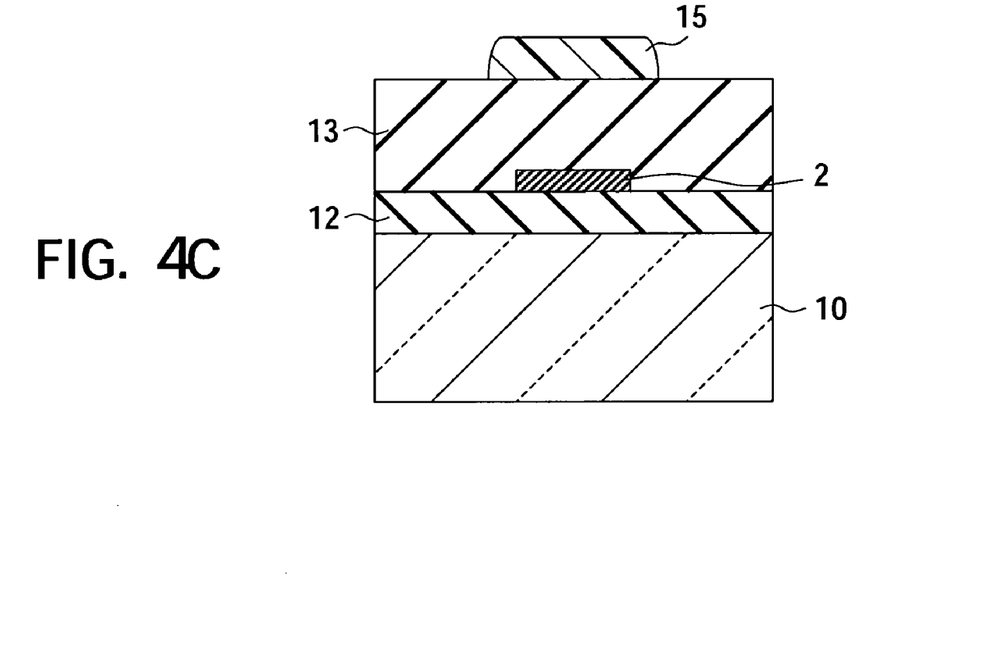
Figure 4D:
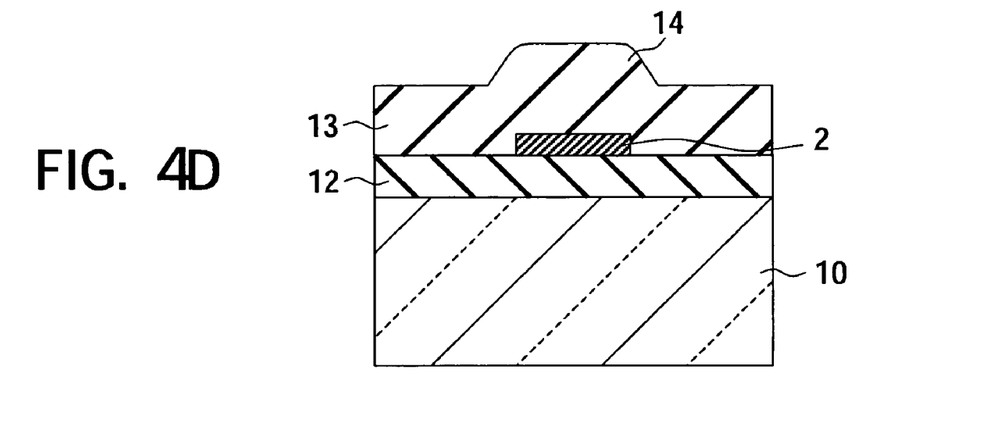

As shown in FIG. 4C, a thermal treatment is performed to smooth a surface of the resist film 15. As shown in FIG. 4D, the insulating layer 13 and the resist film 15 are etched on condition that an etching selectivity ratio of the insulating layer 13 to the resist film 15 is approximately one. As a result, the pattern of the resist film 15 is transferred to the insulating layer 13 to thereby form the surface step 14 in the insulating layer 13.

By smoothing the surface step of the resist film 15 by the thermal treatment, the aligning treatment of the arrangement layer to be formed thereon is easy.

As following steps, the pixel electrode 4 is formed on the insulating layer 13. The arrangement layer is formed on the insulating layer 13 and the pixel electrode 4, and the aligning treatment is performed to the arrangement layer. Note that, if light resistance and heat resistance of the resist film 15 are excellent, the surface step 14 may be formed from the resist film 15, and the pixel electrode 4 may be formed on the resist film 15 and the insulating layer 13.

On the other hand, the counter electrode 21 is formed on the counter substrate 20 and further the color filter is formed thereon if necessary. The arrangement layer is formed on the counter electrode 21 and the aligning treatment is performed to the arrangement layer. Then, the TFT substrate 10 and the counter substrate 20 are sealed with a predetermined interval. The liquid crystal 30 is filled in a space between the TFT substrate 10 and the counter electrode 20 to achieve the liquid crystal display apparatus. Note that, the incidence side polarizing plate and the emitting side polarizing plate may be placed or sealed outside the TFT substrate 10 and the counter substrate 20 respectively.

Figure 5A:
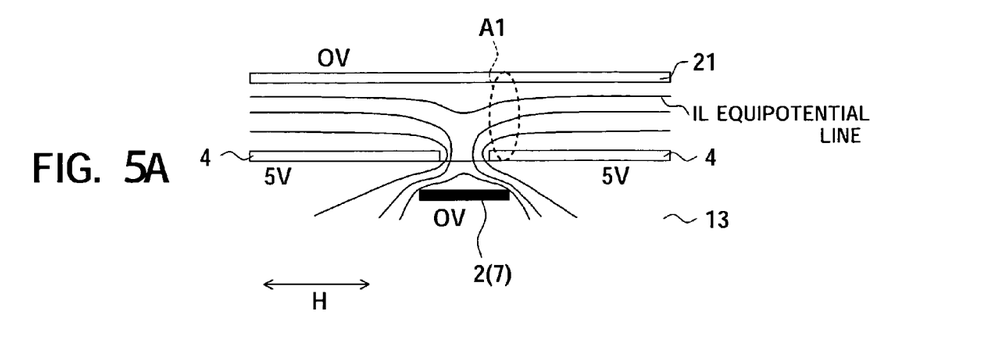
FIG. 5A is a view showing a distribution of electric strength in displaying normally black images in a comparative example.
Figure 5B:
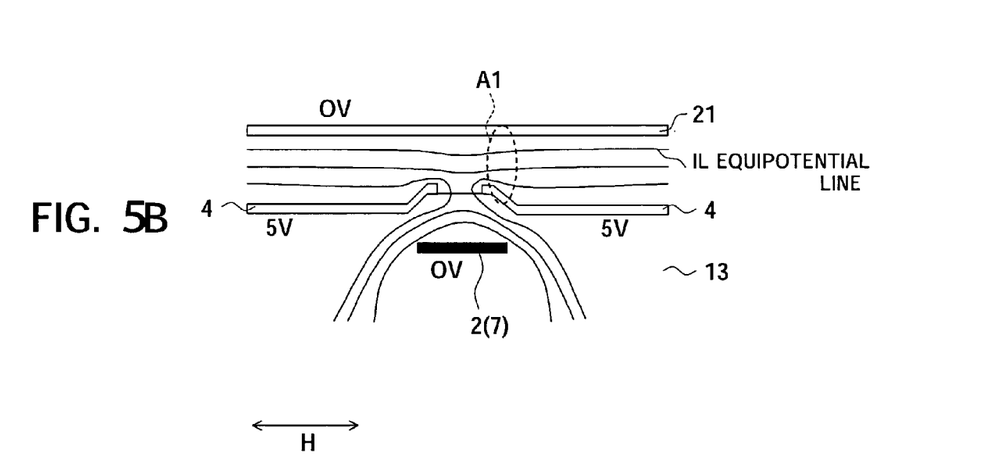
FIG. 5B is a view showing a distribution of the electric strength in displaying the same in the present embodiment.

Next, an effect of the liquid crystal display apparatus having the above substrate will be described with reference of a comparative example. FIG. 5A is a view showing a distribution of electric strength in the vicinity of the signal line in displaying normally black images in the comparative example. The comparative example has the same structure without forming the surface step in the insulating layer 13. FIG. 5B is a view showing a distribution of the electric strength in the vicinity of the signal line in displaying the same in the present embodiment.

The distributions of the electric strength shown in FIGS. 5A and 5B are results of simulations. In those simulations, they were assumed that a potential of the counter electrode 21 is 0 V, a potential of the pixel electrode 4 is 5 V, and a potential of the signal line 2 is 0 V. Note that, a potential of the shield interconnection 7 is held to 0 V even if the shield interconnection 7 exists, so the same result may be obtained.

In the comparative example shown in FIG. 5A, it is understood that an equipotential line IL is curved in a region A1 on an edge portion of the pixel electrode 4, due to an influence of the potential of the signal line 2 which is a lower layer of the pixel electrode 4 and existing between the two pixel electrodes 4 adjoined in the horizontal direction H. For example, the positive twist nematic liquid crystal substance used as the liquid crystal 30 has a feature that a liquid crystal molecule thereof is arranged in perpendicular to the equipotential line. Consequently, the liquid crystal molecule in the region A1 tilts and thus a light leakage occurs in this region.

In the present embodiment shown in FIG. 5B, it is understood that, due to an influence of the surface step 14 of the insulating layer 13, an interval between the counter electrode 21 and the edge portion of the pixel electrode 4 in the region A1 is closer than other regions. Consequently, the equipotential line in the region A1 becomes approximately straight. This causes the liquid crystal molecules to be arranged perpendicular to a surface of the electrode, so the light leakage is sharply lowered. Note that, a region in the vicinity of the aperture of the pixel electrodes 4 is shielded by the signal line 2 or the shield interconnection 7, so, if the equipotential line is curved in this region, the light leakage does not occur.

From the above description, according to the liquid crystal display apparatus in the present embodiment, the light leakage can be prevented in the vicinity of the signal line 2 of the pixel electrode 4. As a result, the liquid crystal display apparatus according to the present embodiment can increase contrast and improve image quality.

Second Embodiment

Figure 6:
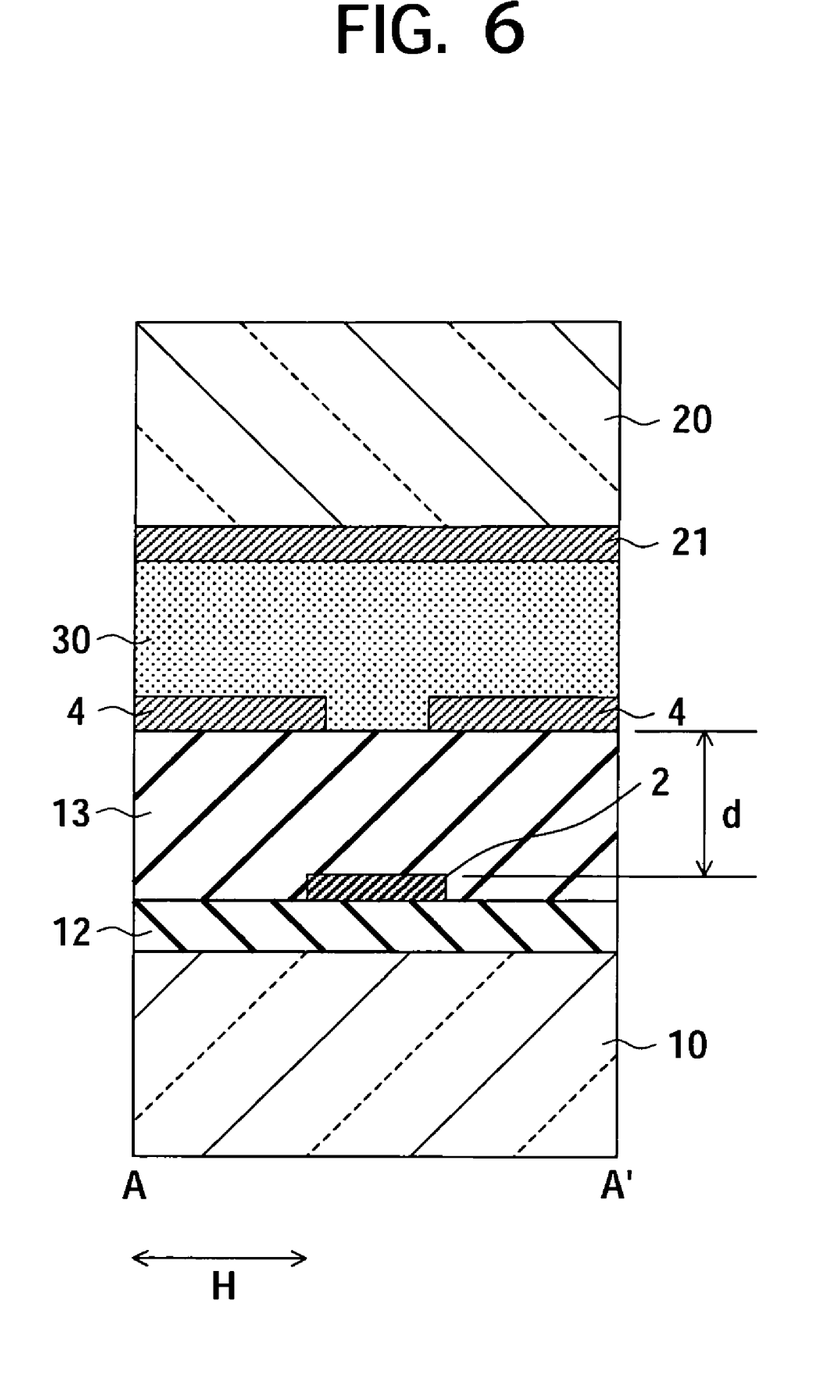
FIG. 6 is a cross-sectional view of a liquid crystal display apparatus according to a second embodiment.

FIG. 6 is a cross-sectional view of a liquid crystal display apparatus of the present embodiment, and the view corresponds to a cross-sectional view along line A-A' of FIG. 1. Components the same as those of the first embodiment are assigned the same notations and explanations thereof are omitted.

In the present embodiment, an insulating layer 13 thicker than the related art is used. The thickness of the insulating layer 13 is set so that a distance from an upper surface of the signal line 2 to a surface of the insulating layer 13 becomes 400 to 1200 nm. Note that, in related art, the distance thereof is approximately 150 nm.

By setting the thickness to equal to and larger than 400 nm, in explanations later, the influence given to the equipotential line due to the potential of the signal line 2 becomes reduced to thereby enable the equipotential line to make approximately straight.

As the insulating layer 13 of the topmost layer is made thick, the influence due to the potential of the signal line 2 becomes reduced. On the other hand, the insulating layer 13 is formed with a contact hole for connecting the pixel electrode 4 to the drain D of the thin film transistor 3. Therefore, if the insulating layer 13 is made thicker so much, an aspect ratio of the contact hole becomes large to thereby make a formation of the contact hole difficult. Further, it takes long time to form the thick insulating layer 13. In terms of above productivity, the distance d is preferably set to equal to or less than 1200 nm.

Figure 7:
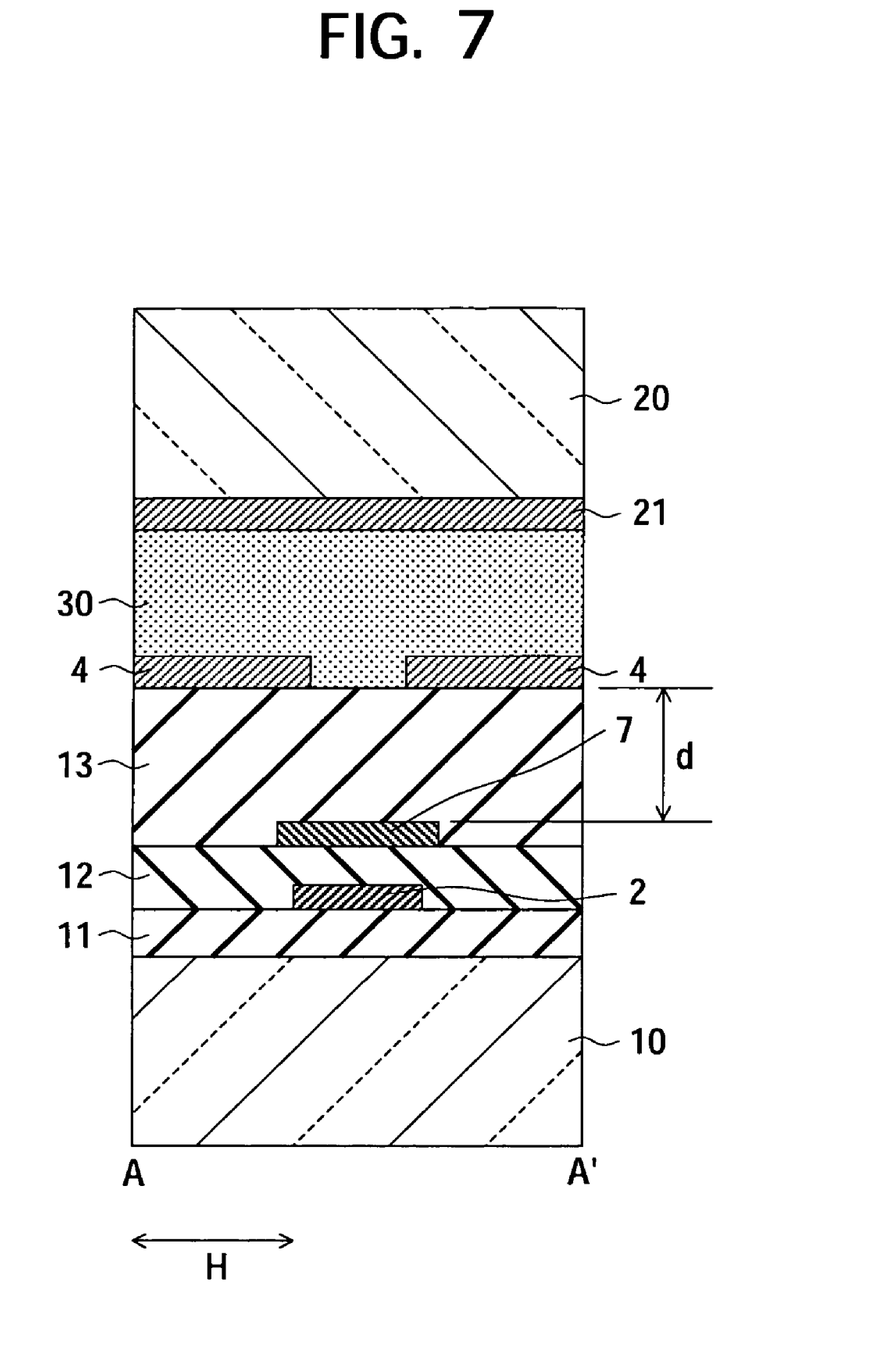
FIG. 7 is a cross-sectional view of the liquid crystal display apparatus in the case where the shield interconnection is provided above the signal line.

Note that, as shown in FIG. 7, the shield interconnection 7 may be placed on the signal layer 2. A structure unit shown in FIG. 7 is adopted in the transmissive liquid crystal panel mainly used to a liquid crystal projector.

As shown in FIG. 7, the insulating layer 11 made of silicon oxide is formed on the TFT substrate 10. The insulating layer 11 is formed on it with the signal line 2. The signal line 2 and the insulating layer 11 are formed on them with the insulating layer 12. The insulating layer 12 is formed on it with the shield interconnection 7. And the shield interconnection 7 is formed at a position corresponding to the signal line 2 and the scan line 1 not shown in the figure. Further, the shield interconnection 7 and the insulating layer 12 are formed on them with the insulating layer 13.

In the case of the structure unit shown in FIG. 7, the insulating layer 13 between the shield interconnection 7 and the pixel electrode 4 is formed thicker than the related art. The thickness of the insulating layer 13 is set so as to be 400 to 1200 nm in the distance d from the upper surface of the shield interconnection 7 to the surface of the insulating layer 13. This reason is described above. Note that, in related art, the distance thereof is approximately 150 nm.

Next, an effect of the liquid crystal display apparatus according to the present embodiment will be described.

Figure 8A:
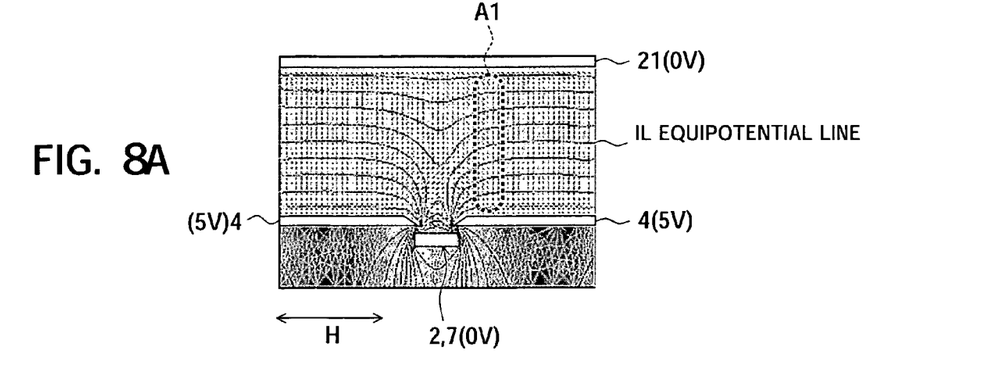
FIGS. 8A to 8C are views showing a distribution of the electric strength, in displaying normally black images, in changing a distance from an upper surface of the signal line to a surface of an insulation layer.
Figure 8B:
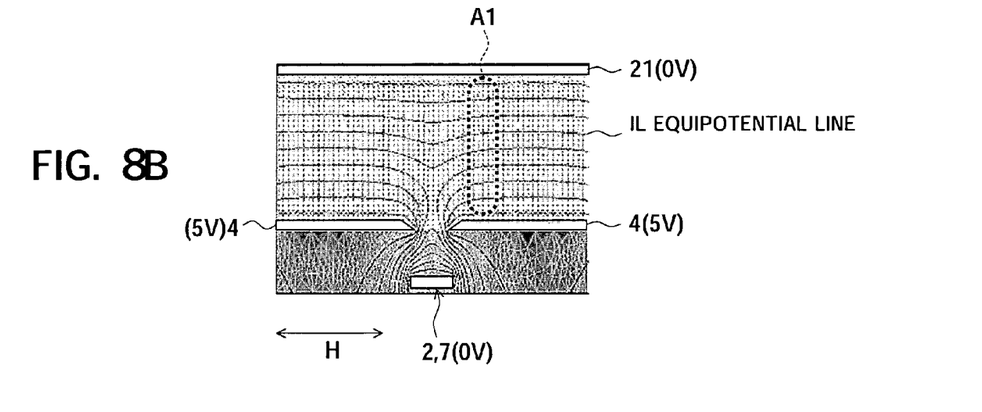
Figure 8C:
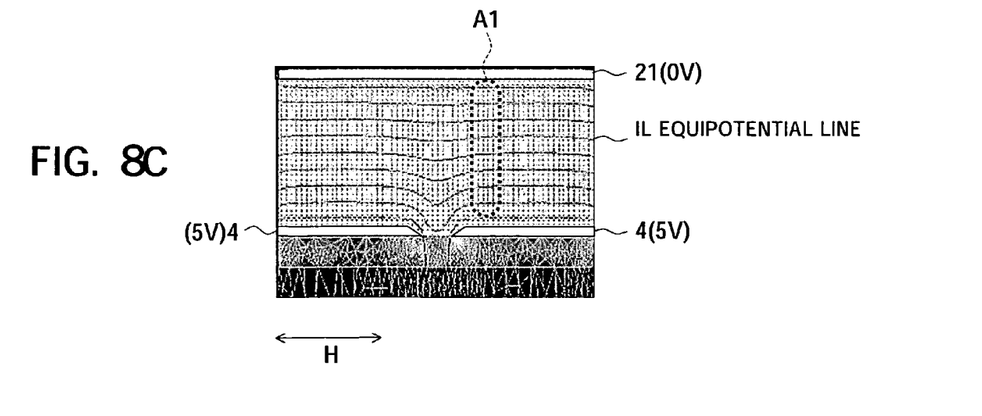

FIGS. 8A to 8C are views showing distributions of the electric strength in changing the distance d from the upper surface of the signal line to the surface of an insulation layer. FIG. 8A is a view of the distribution of the electric strength in the case where the distance d is 150 μm, FIG. 8B is a view of the distribution of the electric strength in the case where the distance d is 400 μm, and FIG. 8C is a view of the distribution of the electric strength in the case where the distance d is infinity.

The distribution of the electric strength shown in FIG. 8A to 8C are results of simulations. In those simulations, they were performed on the assumption that the potential of the counter electrode 21 is 0 V, the potential of the pixel electrode 4 is 5 V, and the potential of the signal line 2 is 0 V. Note that, the potential of the shield interconnection 7 is held to 0 V even if the shield interconnection 7 exists, so the same result may be obtained.

In an example set to 150 μm in the distance d shown in FIG. 8A, it is understood that an equipotential line IL is curved in a region A1, on an edge portion of the pixel electrode 4, due to an influence of the potential of the signal line 2 which is a lower layer of the pixel electrode 4 and existing between the two pixel electrodes 4 adjoined in the horizontal direction H. For example, the positive twist nematic liquid crystal substance used as the liquid crystal 30 has a feature that the liquid crystal molecule thereof is arranged in perpendicular to the equipotential line. Consequently, the liquid crystal molecule in the region A1 tilts and thus the light leakage occurs in this region.

In an example set to 400 μm of the distance d shown in FIG. 8B, the signal line 2 is separated from the pixel electrode 4, so the influence of the potential of the signal line 2 on the equipotential line IL is reduced. As a result, the curvature of the equipotential line is eased. In the case where the distance is equal to or larger than 400 nm, the equipotential line IL in the region A1 is similarly to the case where the distance d is infinity.

Figure 9:
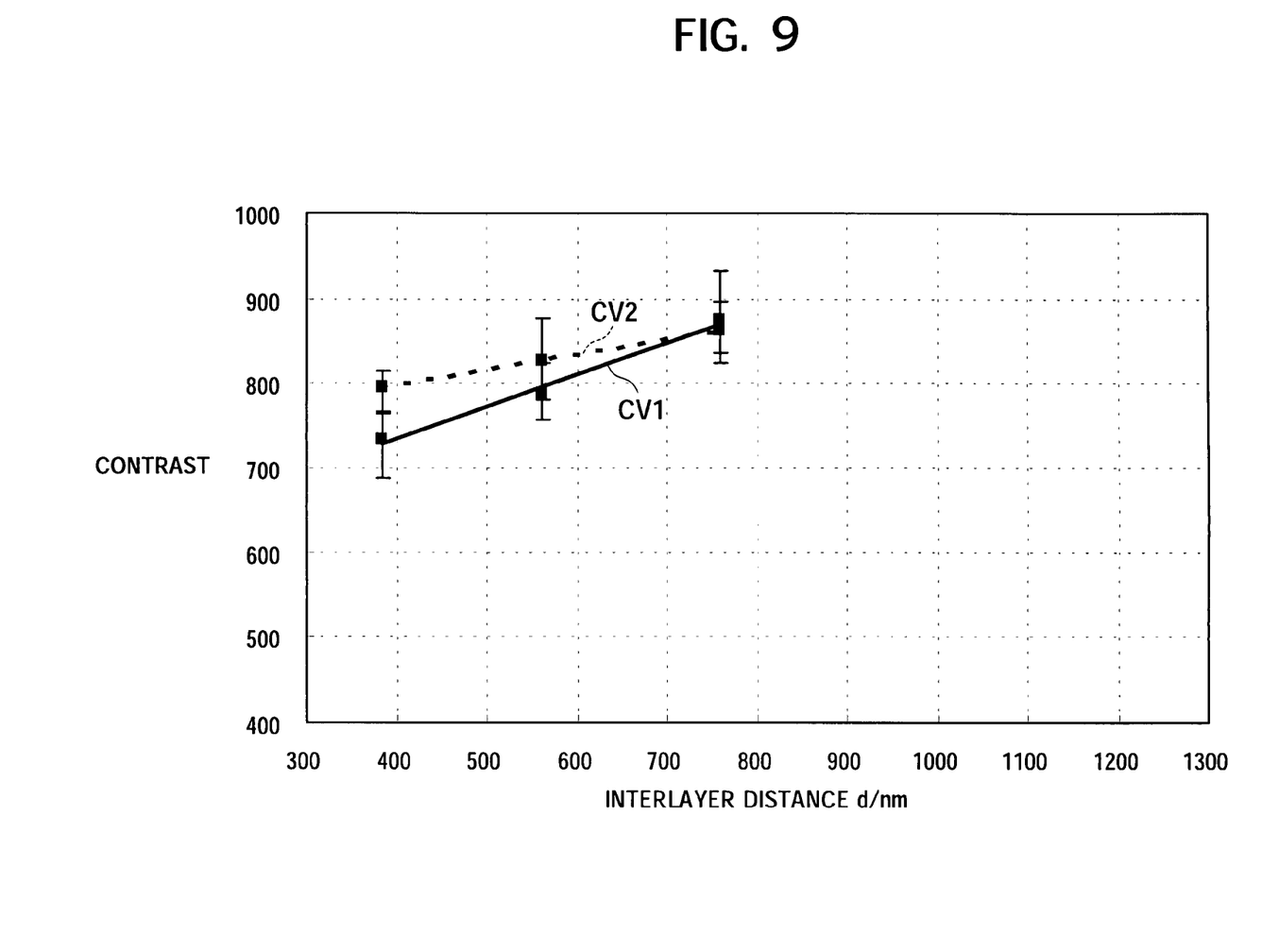
FIG. 9 is a graph showing a measured result of contrast in changing a distance from the upper surface of the signal line to the surface of the insulation layer.

FIG. 9 is a graph showing a measured result of contrast in changing the distance d.

The result shown in FIG. 9 was obtained by measuring a luminance of a 40-inch panel by using an illuminometer. The potential of the pixel electrode 4 is assumed to 7.5 V±0 V in displaying normally white images, 7.5 V±5 V in displaying normally black images, and a luminance ratio of the white images to the black images is assumed as a contrast. CV1 indicates a measured result in the case where the width of the signal line 2 is 2.0 μm, and CV2 indicates a measured result in the case where the same is 2.2 μm.

As shown in FIG. 9, it is understood that the contrast is improved as a distance between the signal line 2 and the pixel electrode 4 becomes large. Basically, the light shield is achieved in the width of the signal line 2 of 2.2 μm (CV2) more than a small width (CV1), so the contrast is also high in a large width (CV2). However, when the distance between the signal line 2 and the pixel electrode 4 is large, in the case of the large width of the signal line 2 and in the case of the small width of the same, the same contrasts are obtained in approximately 750 nm of the distance. Further, CV1 has a gradient larger than CV2. Therefore, a liquid crystal display apparatus making the width of the signal line 2 small to obtain the high aperture ratio, is made large in the distance between the signal line 2 and the pixel electrode 4 to thereby achieve a large contrast improvement effect.

As described above, in the liquid crystal display apparatus according to the present embodiment, the thickness of the insulating layer 13 is set so as to be 400 to 1200 nm in the distance from the signal line 2 to the surface of the insulating layer 13. As a result, the curvature of the equipotential line caused by the potential of the signal line 2 is suppressed to enable a prevention of the light leakage in the vicinity of the signal line of the pixel electrode 4. Therefore, according to the liquid crystal display apparatus in the present embodiment, the contrast can be improved and the image quality can also be improved.

Further, in the structure in which the shield interconnection 7 is provided on the signal line 2, the insulating layer 13 is formed so as to be 400 to 1200 nm in the distance from the shield interconnection 7 to the surface of the insulating layer 13, so the curvature of the equipotential line caused by the potential of the shield interconnection 7 is suppressed to enable the prevention of the light leakage in the edge portion of the pixel electrode 4 in the horizontal direction. Consequently, the contrast can be improved and the image quality can also be improved.

The present invention is not limited to the above embodiments.

For example, the liquid crystal display apparatus according to the present embodiment can be applied to a direct-view display apparatus in which a surface light source is arranged at one of the TFT substrate 10 and the counter substrate 20 to directly view an image from an opposed side to a surface light source. The liquid crystal display apparatus can be applied to a projection type display apparatus projecting transmitted light through the TFT substrate 10 or the counter substrate 20, for example, to a screen to see a projected image.

For example, the present invention can be applied to a reflective liquid crystal display apparatus. In this case, one of the pixel electrode 4 and the counter electrode 21 may be formed of a light reflection substance and the other of them and the electrode substrate thereof may be formed of a transparent substance. Also, the present invention can be applied to, for example, a transflective (semi-transmissive) liquid crystal display apparatus capable of a transmissive display and a reflective display.

It should be understood by those skilled in the art that various modifications, combinations, sub-combinations and alterations may occur depending on design requirements and other factors in so far as they are within scope of the appeared claims or the equivalents thereof.

What is claimed is:

1. A liquid crystal display apparatus, comprising:
   a substrate containing switching devices and having a substantially planar major surface;
   a signal line extending in a first direction;
   a first insulating layer between said signal line and said substrate;
   a plurality of pixel electrodes arranged in parallel rows extending in said first direction;
   a second insulting layer between said signal line and said pixel electrodes and completely encompassing said signal line within a first thickness of said second insulating layer, said second insulating layer having a stripe-shaped surface step in registry with said signal line, said surface step having a top surface at a second thickness facing said pixel electrodes which is parallel to an upper surface of said substrate, said second thickness being greater than said first thickness;
   a counter substrate;
   a counter electrode between said counter substrate and said pixel electrodes;
   a liquid crystal layer between said counter electrode and said pixel electrodes; and
   a scan line which extends in a second direction perpendicular to said first direction and which is positioned between said substrate and said second insulating layer,
   wherein,
      edge portions of each pixel electrode conform about and overlap said top surface and side walls of said surface step,
      said edge portions extend into said liquid crystal layer; and
      each pixel electrode is electrically connected to a respective switching device and each such switching device is connected to the scan line and the signal line.

2. The liquid crystal display apparatus of claim 1, further comprising an electrical shield line between and in registry with said scan line and said signal line.

3. The liquid crystal display apparatus of claim 1, wherein a distance from the signal line to a surface of the second insulating layer facing said pixel electrodes is 400 to 1200 nm.

4. The liquid crystal display apparatus of claim 1, wherein a distance between said signal line and a surface of said second insulating layer facing said pixel electrodes is such that a curvature of an equipotential line resulting from a potential of the signal line is sufficiently suppressed to prevent leakage of light in a vicinity of the overlapping edge portions of the pixel electrodes.

5. The liquid crystal display apparatus of claim 2 wherein a distance between said shield layer and a surface of said second insulating layer facing said pixel electrodes is such that a curvature of an equipotential line resulting from a potential of the shield layer is sufficiently suppressed to prevent leakage of light in a vicinity of the overlapping edge portions of the pixel electrodes in a horizontal direction.

6. The liquid crystal display apparatus of claim 1, wherein said edges of said pixel electrodes are an contact with said top surface and said side walls of said surface step.

* * * * *